United States Patent
Hegemann et al.

(10) Patent No.: US 9,644,521 B2
(45) Date of Patent: May 9, 2017

(54) METHOD FOR OPERATING AN EXHAUST GAS PURIFICATION SYSTEM OF A MOTOR VEHICLE COMBUSTION ENGINE

(71) Applicant: Daimler AG, Stuttgart (DE)

(72) Inventors: Rainer Hegemann, Ludwigsburg (DE); Eugen Neuberger, Goellheim (DE); Markus Paule, Korb (DE); Norbert Waldbuesser, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/783,395

(22) PCT Filed: Mar. 15, 2014

(86) PCT No.: PCT/EP2014/000699
§ 371 (c)(1),
(2) Date: Oct. 8, 2015

(87) PCT Pub. No.: WO2014/166575
PCT Pub. Date: Oct. 16, 2014

(65) Prior Publication Data
US 2016/0069243 A1    Mar. 10, 2016

(30) Foreign Application Priority Data

Apr. 10, 2013 (DE) .......................... 10 2013 006 153

(51) Int. Cl.
*F01N 3/00* (2006.01)
*F01N 11/00* (2006.01)
(Continued)

(52) U.S. Cl.
CPC .............. *F01N 11/007* (2013.01); *F01N 3/10* (2013.01); *F01N 3/208* (2013.01);
(Continued)

(58) Field of Classification Search
USPC .......... 60/274, 276, 286, 295, 297, 301, 303
See application file for complete search history.

(56) References Cited

U.S. PATENT DOCUMENTS 7,316,157 B2 *   1/2008   Ohsaki .................. F01N 11/002
                                                        73/114.69
8,429,898 B2 *   4/2013   Darr ........................ F01N 3/208
                                                        60/274
(Continued)

FOREIGN PATENT DOCUMENTS

DE    10 2007 016 478 A1    10/2008
DE    10 2008 036 884 A1    2/2010
(Continued)

OTHER PUBLICATIONS

PCT/EP2014/000699, International Search Report (PCT/ISA/220 and PCT/ISA/210) dated Oct. 2, 2014, with partial English translation, enclosing Written Opinion of the International Searching Authority (PCT/ISA/237) (Eleven (11) pages).
(Continued)

*Primary Examiner* — Binh Q Tran
(74) *Attorney, Agent, or Firm* — Crowell & Moring LLP

(57) ABSTRACT

A method for operating an exhaust gas purification system of a motor vehicle internal combustion engine is disclosed. The system has an SCR catalyst where a reducing agent containing ammonia is metered into the exhaust gas at a predeterminable metering rate which is produced from a base value and an adaptation factor which corrects the base value. A test procedure checks and, if appropriate, adjusts the adaptation factor where a first nitrogen oxide value is compared with a second nitrogen oxide value of the exhaust gas, where the first and the second nitrogen oxide value are determined by the same nitrogen oxide sensor disposed downstream of the SCR catalyst. The first nitrogen oxide value is determined when the metering of the reducing agent (Continued)

is switched off and the second nitrogen oxide value is determined when the reducing agent is metered at a test metering rate which can be predetermined.

13 Claims, 1 Drawing Sheet

(51) Int. Cl.
    *F01N 3/20*     (2006.01)
    *F01N 3/10*     (2006.01)

(52) U.S. Cl.
    CPC .... *F01N 2550/02* (2013.01); *F01N 2560/026* (2013.01); *F01N 2610/02* (2013.01); *F01N 2900/1402* (2013.01); *Y02T 10/24* (2013.01)

(56) References Cited

U.S. PATENT DOCUMENTS

| | | | | |
|---|---|---|---|---|
| 8,453,434 | B2* | 6/2013 | Yacoub | F01N 3/208 60/274 |
| 8,667,782 | B2* | 3/2014 | Yasui | F01N 3/103 60/284 |
| 8,863,499 | B2* | 10/2014 | Kowalkowski | F01N 11/00 60/276 |
| 9,010,087 | B1* | 4/2015 | Upadhyay | F01N 3/18 60/274 |
| 2003/0051468 | A1 | 3/2003 | Van Nieuwstadt et al. | |
| 2011/0252767 | A1 | 10/2011 | Lin et al. | |
| 2011/0308233 | A1 | 12/2011 | Darr et al. | |

FOREIGN PATENT DOCUMENTS

| | | |
|---|---|---|
| DE | 10 2008 041 603 A1 | 3/2010 |
| DE | 10 2008 054 952 A1 | 6/2010 |
| DE | 10 2011 104 231 A1 | 12/2011 |
| FR | 2 931 201 A1 | 11/2009 |

OTHER PUBLICATIONS

German Search Report issued in counterpart DE 10 2013 006 153.9 dated Nov. 12, 2013, with Statement of Relevancy (Six (6) pages).

\* cited by examiner

METHOD FOR OPERATING AN EXHAUST GAS PURIFICATION SYSTEM OF A MOTOR VEHICLE COMBUSTION ENGINE

BACKGROUND AND SUMMARY OF THE INVENTION

The invention relates to a method for operating an exhaust gas purification system of a motor vehicle internal combustion engine, the system having a selective catalytic reduction (SCR) catalyst for the selective catalytic reduction of nitrogen oxides.

A method for operating an exhaust gas purification system having an SCR catalyst for the selective catalytic reduction of nitrogen oxide (NOx) is known from DE 10 2008 036 884 A1, wherein a metering rate for a reducing agent containing ammonia for NOx reduction is adapted by changing an adaptation factor if appropriate, if there are excessive deviations from emission values obtained by modeling and by measurement. In this case, NOx emission values are captured metrologically by means of exhaust gas sensors both before and also after the SCR catalyst.

The object of the invention is to provide a method which is simplified in this connection.

In the method according to the invention a reducing agent containing ammonia ($NH_3$), in particular an aqueous urea solution, is metered into the exhaust gas at a predeterminable metering rate resulting from a base value and an adaptation factor correcting the base value. From time to time, a test procedure is carried out in order to check and, if appropriate, to adjust the adaptation factor. In this test procedure, a first nitrogen oxide value of the exhaust gas is compared with a second nitrogen oxide value of the exhaust gas, wherein the first nitrogen oxide value and the second nitrogen oxide value are determined by one and the same nitrogen oxide sensor disposed downstream of the SCR catalyst. To this end, the first nitrogen oxide value is determined when the metering of the reducing agent is deactivated and the second nitrogen oxide value is determined when the reducing agent is metered at a test metering rate which can be predetermined.

The checking of the adaptation factor which is carried out from time to time makes it possible to recognize and, if appropriate, to correct changes occurring due to aging or drift phenomena in the exhaust gas system. If the changes exceed a predeterminable extent, provision is made to carry out an adjustment of the adaptation factor and thus an adaptation of the metering rate to the changed conditions. This enables compensation for example for drift phenomena from system components and inaccuracies which are contingent upon aging, so that a high nitrogen oxide purification rate can also be achieved over relatively long operating periods. The metering rate is preferably produced from the base value and the adaptation factor by multiplicative combination. To this end, the base value is preferably determined by a computer model or is inferred from characteristic fields. With the same predetermined operating conditions, the same base values are preferably used. Time-related system changes which necessitate an adaptation of the metering rate in order to enable high nitrogen oxide reduction values to be achieved over a long period of time, are preferably compensated for by an adjustment of the adaptation factor.

Because one and the same nitrogen oxide sensor is used for capturing the first and the second nitrogen oxide value, it is possible to omit a second nitrogen oxide sensor used upstream of the SCR catalyst, resulting in corresponding cost advantages for the exhaust gas purification system according to the invention. An upstream NOx sensor is used frequently in exhaust gas purification systems which are known from the prior art for the determination of the raw NOx emission, i.e., for the determination of the amount of NOx flowing into the SCR catalyst with the exhaust gas. In the present case, the downstream NOx sensor is used for this purpose. In this case advantage is taken of the knowledge that, with the metering of the reducing agent deactivated, the SCR catalyst is ineffective with regard to its nitrogen oxide reduction function, and for this reason the NOx concentration in the exhaust gas, measured at the discharge end of the SCR catalyst by means of the preferably single NOx sensor present in the exhaust gas purification system, corresponds to the NOx concentration in the exhaust gas present at the intake end. This is equal to the raw NOx emission from the internal combustion engine in the absence of further exhaust gas purification components which can effect an NOx reduction. If the reducing agent is then metered in at a predeterminable test metering rate, an NOx reduction of the SCR catalyst corresponding to the test metering rate can be determined from the NOx emission measured downstream of the SCR catalyst using the raw NOx emission previously determined with the metering deactivated. If this deviates from the base value modeled for the corresponding operating point, the adaptation factor is adapted in such a way that the previously determined NOx reduction is produced by computation with the adjusted adaptation factor. Until a further check and, if appropriate, repeated adjustment of the adaptation factor is performed at a later time, metering of the reducing agent then takes place at a metering rate which is determined by the base value and the adjusted adaptation factor.

In one embodiment of the invention, in an SCR catalyst with the capability for storing ammonia, the first nitrogen oxide value is determined with an SCR catalyst free of stored ammonia. In this way it is ensured that the first nitrogen oxide value actually corresponds to the raw NOx emission of the internal combustion engine and it is not for instance the case that, due to residual quantities of ammonia stored in the SCR catalyst, which would effect a reduction of NOx in the SCR catalyst, a nitrogen oxide value which deviates from the raw NOx emission is measured. In order to free the SCR catalyst from stored reducing agent, provision is preferably made to operate the SCR catalyst with the metering deactivated for a predeterminable time period and, only after this time period has elapsed, to determine the first nitrogen oxide value.

In a further embodiment of the invention the test procedure is carried out following a thermal regeneration of a particle filter associated with the exhaust gas purification system. Since a thermal regeneration of the particle filter takes place at an elevated exhaust gas temperature of approximately 550° C. or more, the SCR catalyst has, following the particle filter regeneration, an elevated temperature and therefore in any case a small amount of stored ammonia. Therefore, the operation of freeing the SCR catalyst of stored ammonia when carrying out the test procedure may be brief or may even be completely omitted.

In a further embodiment of the invention, the base value is determined by a computer model which uses an estimated operating point-dependent nitrogen oxide conversion capacity of the SCR catalyst and an estimated operating point-dependent raw NOx emission of the internal combustion engine. In this case, for estimating the operating point-dependent nitrogen oxide conversion capacity of the SCR catalyst, exhaust gas operating parameters which influence the conversion capacity of the SCR catalyst, such as exhaust gas temperature, exhaust gas throughput and emission values, are preferably determined by computation and/or by sensors and a corresponding conversion capacity is determined by computation or is inferred from previously stored characteristic curves. The raw NOx emission of the internal combustion engine is preferably determined with reference to a computed raw NOx emission model and from previously stored characteristic curves as a function of engine load and engine speed as well as, if appropriate, further influencing factors. The use of a nitrogen oxide sensor disposed upstream from the SCR catalyst is preferably omitted.

In a further embodiment of the invention, when the second nitrogen oxide value is determined, a test metering rate is set which corresponds to a predeterminable desired NOx conversion. The test metering rate is preferably set so that an NOx reduction of the SCR catalyst which is below the maximum possible value is produced by computation. This avoids an unintentional over-metering, which could lead to an ammonia slip and an incorrect measurement of the second nitrogen oxide value. In particular in a further embodiment of the method according to the invention, it is provided that a test metering rate is set which corresponds to a computed desired NOx conversion of the SCR catalyst in a range from 20% to 80%, particularly preferably in a range from 40% to 70%.

In a further embodiment of the invention, the test procedure is carried out under stationary or quasi-stationary conditions. These should be understood to be conditions under which substantially constant values or at most slight fluctuations of values for exhaust gas temperature and raw NOx emission are present. As a result it is ensured that a conversion rate of the SCR catalyst calculated from the first and the second nitrogen oxide value can be unambiguously associated with a specific operational state. If the operating conditions change during the test procedure beyond a predeterminable extent, provision is preferably made to cancel the test procedure and to restart it at a later time.

In a further embodiment of the invention it is provided that the first and/or the second nitrogen oxide value is/are obtained by integration of a sensor signal provided by the nitrogen oxide sensor. As a result, an improved precision and reliability in the determination of the first and the second nitrogen oxide value are achieved. The integration of the values preferably takes place over a predeterminable time period.

Further advantages, features and details of the invention are disclosed by the following description of preferred embodiments and with reference to the drawings. The features and combinations of features stated above in the description and the features and combinations of features stated below in the description of the drawings and/or in the drawings alone can be used not only in the combination specified in each case, but also in other combinations or in isolation, without departing from the scope of the invention.

DETAILED DESCRIPTION OF THE DRAWINGS

Figure 1:
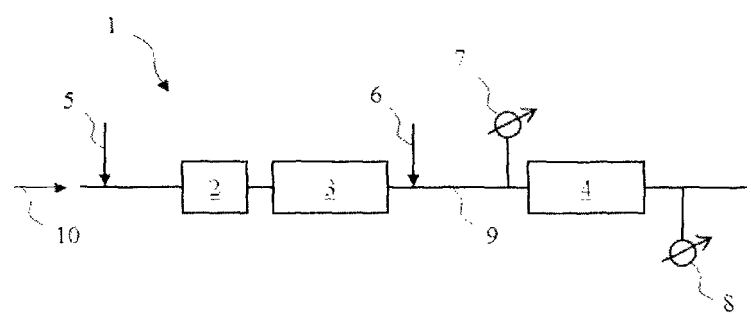
FIG. 1 shows a schematic block diagram of an exhaust gas purification system connected to a motor vehicle internal combustion engine.

In FIG. 1, an exhaust gas purification system 1 of a motor vehicle internal combustion engine, in particular a diesel engine, is illustrated quite schematically. Exhaust gas from the internal combustion engine (not shown) enters the exhaust gas purification system 1 in the direction identified by the arrow 10. Viewed in the exhaust gas flow direction, this has, in succession, an oxidation catalyst 2, a particle filter 3 and an SCR catalyst 4 in an exhaust gas pipe 9. The SCR catalyst 4 may also be formed as a dual-flow catalyst arrangement of two parallel-connected catalyst units.

The exhaust gas purification system 1 also has a fuel feed device 5 upstream of the oxidation catalyst 2. By means of the fuel feed device 5, a fuel containing hydrocarbon and/or hydrogen can be introduced into the exhaust gas pipe 9. The fuel feed device 5 is preferably provided in order to deliver fuel present on board the vehicle, in particular for driving the vehicle, to the exhaust gas.

A reducing agent having $NH_3$ in free or bound form can be delivered by means of a reducing agent feed device 6 to the exhaust gas for selective catalytic NOx reduction. Without limitation of the generality, it is assumed hereafter that the reducing agent is an aqueous urea solution (AUS). The AUS preferably has a desired urea concentration of approximately 32% and is taken from a storage container (not shown).

Furthermore, a sensor 8 which is sensitive with respect to NOx is provided downstream of the SCR catalyst 4. On the intake side of the SCR catalyst 4, a temperature sensor 7 is provided for recording the exhaust gas temperature or the temperature of the SCR catalyst 4. An arrangement downstream of the SCR catalyst 4 can likewise be provided. As explained in greater detail below, the NOx conversion of the SCR catalyst 4 can be determined by evaluation of the signal emitted by the NOx sensor 8. For this purpose, a control device (not shown) is preferably provided which receives and can process the signals from the sensors 7, 8 as well as signals from further sensors (not shown in greater detail). Moreover, the control device can preferably control the operation of the feed devices 5, 6 and carry out further control and evaluation functions relating to the operation of the internal combustion engine and the exhaust gas purification system 1.

It will be understood that the exhaust gas purification system 1 can have further catalytic or effective filtering components (not illustrated separately here) which serve for exhaust gas purification. In particular, an ammonia slip catalyst can be provided for oxidation of $NH_3$ slip after the SCR catalyst 4. Furthermore, additional exhaust gas, pressure and temperature sensors (not shown), exhaust gas, pressure and temperature sensors are preferably provided, and by means of the signals therefrom the operation of the exhaust gas purification system 1 and of the internal combustion engine can be adjusted appropriately. Temperature sensors are preferably provided in each case before and after the oxidation catalyst 2 and/or the particle filter 3 and/or the SCR catalyst 4.

The oxidation catalyst 2 is preferably designed as a so-called diesel oxidation catalyst with a coating with little or no oxygen storage capacity. A coating can also be provided with a three-way catalyst function. A substrate for the coating is preferably formed as a ceramic substrate or as a metal foil substrate body. Moreover, a heating element is directly connected upstream, preferably formed as a coated metal foil substrate body (so-called E-cat).

The particle filter 3 may have a sintered metal design or may be formed as a filter unit having a honeycomb design with flow through the walls. A catalytic coating, for example with a material which is effective as an oxidation catalyst and/or with an SCR catalyst material, is preferably provided for the particle filter 3. In the latter case, the reducing agent feeding device 6 is preferably disposed between the oxidation catalyst 2 and the particle filter 3. Under oxidizing conditions, the SCR catalyst material can catalyze a selective, continuous reduction of NOx by means of stored and/or supplied ammonia ($NH_3$) as a selective NOx reducing agent. A zeolite containing iron or copper is preferred as catalyst material. The SCR catalyst material may be provided on the raw gas side and/or on the pure gas side of the effective filtering surfaces of the particle filter 3. In the preferred design of the particle filter 3 as a conventional filter having a honeycomb design with flow through the walls, a coating which is present there if appropriate is provided with the corresponding SCR catalyst material preferably on the channel walls which are exposed to raw gas. In particular in this case it may be advantageous to provide the SCR catalyst coating only on portions of the channel walls of the particle filter 3 on the inlet side or on the outlet side. For example, a coating with the SCR catalyst material may be provided over a first part of the axial extent of the particle filter 3 which is approximately 50% of the length. The rear portion, when viewed in the axial direction, may be uncoated or may be provided with a coating which is effective as an oxidation catalyst.

The SCR catalyst 4 disposed downstream of the particle filter 3 is capable, in an analogous manner to an SCR coating which is provided if appropriate on the particle filter 3, of selective reduction of NOx with $NH_3$ and is preferably designed in a similar manner with regard to such a coating. Two different SCR coatings disposed one behind the other in the exhaust gas flow direction and having a different temperature range can be provided for maximum effectiveness on one and the same substrate bodies or on two substrate bodies disposed one behind the other a short distance apart. Zoned coatings comprising a zeolite containing iron and one containing copper are preferred. The SCR catalyst is preferably disposed remote from the engine in the underbody region of the vehicle. In any case, particularly preferred is an arrangement in the exhaust gas system 9 in such a way that during a thermal particle filter regeneration, the temperature of the SCR catalyst 4 does not rise above 650° C. Due to the geometric distance from the particle filter 3 in conjunction with a corresponding dimensioning of the exhaust gas pipe 9 with regard to heat dissipation, a temperature differential of more than 200° C. or more can be achieved between a particle filter 3 heated to approximately 800° C. and the SCR catalyst 4.

In order to carry out a thermal regeneration of the particle filter 3 by burning soot, the fuel feed device 5 is activated and fuel, in particular diesel fuel, is added to the exhaust gas. By oxidation of the fuel on the oxidation catalyst 2, the exhaust gas delivered to the particle filter 3 and the particle filter 3 are heated to a temperature of approximately 600° C. to 850° C. necessary for burning soot. For the entire duration of the thermal particle filter regeneration, a supply of fuel, possibly with interruptions, is generally necessary in order to keep the temperature of the particle filter 3 at the temperature necessary for burning soot.

The method according to the invention for operating the SCR catalyst 4 is explained in greater detail below.

In the normal operational state of the exhaust gas purification system 1 and of the internal combustion engine, the control device calculates a metering rate for the reducing agent metered into the exhaust gas by means of the reducing agent feed device 6. In the present case, the metering rate is obtained from a base value and an adaptation factor which corrects the base value. The base value for the metering rate is calculated from operational state variables of the exhaust gas such as temperature, throughput, NOx content, ratio of nitrogen dioxide to nitrogen monoxide, oxygen content and if appropriate further variables, and also from operational state variables of the SCR catalyst 4 such as temperature, quantity of stored ammonia, efficiency of the NOx reduction and if appropriate further variables by means of a computer model and/or from characteristic curves stored in advance, in such a way as to result in a predeterminable desired NOx conversion, which is as high as possible but meets at least one of the requirements, by the SCR catalyst 4. The reducing agent feed device 6 is controlled by the control device for outputting the continuously calculated metering rate by a corresponding control signal.

Although in general a substantial nitrogen oxide reduction can be achieved by the SCR catalyst 4, undesirable deviations of the actually present NOx conversion from the desired conversion or over-metering associated with an ammonia slip can occur due to drift phenomena and tolerances of system components. In order to avoid this or at least to minimize it, a test procedure in which the adaptation factor is checked is to be carried out from time to time. In this case, as explained below, the NOx conversion of the SCR catalyst 4 is determined metrologically by means of the NOx sensor 8. If the determined NOx conversion deviates from the desired conversion by more than a predeterminable amount, the adaptation factor is changed in such a way that by computation together with the base value, a changed metering rate is produced, by which the desired conversion can be achieved.

The test procedure can be carried out whenever predeterminable release conditions therefor are met. These include in particular the presence of a stationary or quasi-stationary operational state with regard to the temperature of the exhaust gas or of the SCR catalyst as well as the raw NOx emission of the internal combustion engine and of the ratio of nitrogen dioxide and nitrogen monoxide to be expected in the exhaust gas on the intake side of the SCR catalyst 4. The presence of an at least approximately constant temperature of the SCR catalyst can be specifically queried or required. In this case, a temperature in a range between 300° C. and 350° C. is preferred. It is particularly preferable to request the test procedure after thermal regeneration of the particle filter 3 has been carried out. In this case, there is a high probability that the SCR catalyst 4 has a temperature in the aforementioned range. However, the test procedure may also be requested when the NOx sensor 8 supplies signal values which lie outside a value range which is to be expected on the basis of the calculated metering rate or of the NOx conversion calculated on the basis of the metering rate.

If the release conditions for carrying out the test procedure are present, in a first phase the metering of the reducing agent is temporarily deactivated by means of the reducing agent feed device 6. The deactivation phase is maintained until an emptying time calculated by the calculation model for freeing the SCR catalyst 4 of stored ammonia has passed.

In a second phase, which follows the emptying phase as the first phase of the test procedure, with the metering of the reducing agent still deactivated, a first nitrogen oxide value is captured by the nitrogen oxide sensor 8. The first nitrogen oxide value preferably constitutes a mass-related amount of NOx determined by integration of sensor signal values over a predeterminable or predetermined time period of approximately 30 seconds to 3 minutes. In this connection, NOx concentration values supplied by the nitrogen oxide sensor 8 as raw values are preferably recalculated into the mass-related amount of NOx, taking into account the exhaust gas mass flow known on the basis of the current engine operating state. Since the SCR catalyst 4 is inactive on the basis of its state freed from stored ammonia and the deactivated metering of the reducing agent in relation to a nitrogen oxide reduction, this amount of NOx corresponds to the amount of raw NOx emission emitted by the internal combustion engine in the integration time period.

In a third phase following the second phase of the test procedure, the reducing agent feed device 6 is controlled for output of a test metering rate for the reducing agent, at which the SCR catalyst 4 effects a predetermined desired NOx conversion according to the computer model under the present operating conditions. A test metering rate is preferably set which effects a predetermined desired NOx conversion in a range from 40% to 70%. In this case, in an analogous manner to the second phase, a second nitrogen oxide value is captured by the nitrogen oxide sensor. An actual NOx conversion is calculated from this mass-related second nitrogen oxide value, which is likewise determined by integration over approximately the same time period as in the first phase, and also from the first nitrogen oxide value. In this case, in particular if the integration durations are different in the determination of the first and the second nitrogen oxide value, these values are used as time-related values.

From the desired NOx conversion and the determined actual NOx conversion, an adaptation factor is determined by quotient formation, by which, in operating phases following the test procedure ended thereby, the computed base value for the metering rate is multiplied.

Figure 2:
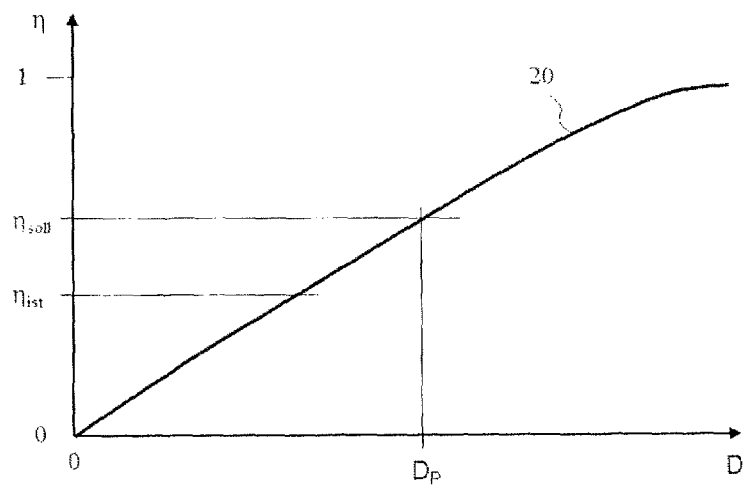
FIG. 2 shows a diagram in which a computed desired NOx conversion is shown as a function of a reducing agent metering rate.

The illustrated preferred procedure is again explained below with reference to a numerical example. In this connection reference is made to a characteristic curve which is illustrated in FIG. 2 and which represents a computed desired NOx conversion η as a function of a metering rate D for the operating conditions prevailing in the test procedure. In this case it is assumed that the characteristic curve is generated or predetermined by the computer model at least as a function of the raw NOx emission from the internal combustion engine, the exhaust gas throughput, the temperature of the SCR catalyst 4 as well as the ratio of nitrogen dioxide and nitrogen monoxide in the exhaust gas. The characteristic curve 20 sketched in the diagram of FIG. 2 may represent the desired NOx conversion η as a function of the base value for the metering rate D or as a function of the base value corrected by a currently valid adaptation factor.

If in the case of the present request for the test procedure the release conditions are met and the SCR catalyst 4 is freed from stored ammonia, for determination of the raw NOx emission from the internal combustion engine, the signal from the nitrogen oxide sensor 8 is captured over a predeterminable first period of time and an integral mass-related first nitrogen oxide value is calculated. It is assumed for example that this first nitrogen oxide value corresponds to 250 mg of NOx. This value constitutes a preferred value for fixing the first period of time and is regarded during the further calculation as the raw NOx emission emitted in the first period of time by the internal combustion engine.

Thus the second phase of determination of the raw NOx emission of the test procedure is ended and for carrying out the third phase, a test metering rate DP for the reducing agent is set according to the characteristic curve 20 illustrated in FIG. 2. In this case it is assumed for example that the test metering rate DP is selected so that a computed desired NOx conversion η soll of 60% is effected by the SCR catalyst 4. In this case, moreover, it is assumed that conditions prevail under which approximately 0.35 to 0.4 mass units of ammonia (NH3) are necessary for the conversion of a mass unit of NOx. Thus the so-called stoichiometric factor is between 0.35 and 0.4. This constitutes a preferred range for carrying out the test procedure which results from the current operating conditions, in particular from the ratio of nitrogen dioxide and nitrogen monoxide as well as the temperature in the exhaust gas.

In this case it is for example assumed that the stoichiometric factor is 0.37. Thus in order to achieve the desired NOx conversion $\eta_{soll}$ of 60% of the nitrogen oxides emitted in a time corresponding to the first period of time by the internal combustion engine, an amount of $NH_3$ of $$m_{NH3}=250 \text{ mg}*0.6*0.37=55.5 \text{ mg}$$

is necessary.

Accordingly, in the third phase of the test procedure, the control device controls the reducing agent feed device 6 for output of a test metering rate DP of the reducing agent which corresponds to an amount of ammonia $m_{NH3}$ of 55.5 based on the first period of time. If a characteristic curve 20 is assumed, which represents a desired NOx conversion $\eta_{soll}$ as a function of a base value already corrected by a current adaptation factor for the metering rate DP, it is presently provided for the metering of the reducing agent to be set such that it corresponds to a time-related amount of ammonia $m_{NH3}$ corrected by the current adaptation factor.

After a waiting time which may be provided, if appropriate, for stabilization of an amount of stored ammonia in the SCR catalyst 4, the signal from the nitrogen oxide sensor 8 is captured over a predeterminable second period of time and an integral mass-related second nitrogen oxide value is calculated. The second period of time preferably corresponds at least approximately to the first period of time. However, it may also be chosen to be different from the first period of time. In this case, the mass-related second nitrogen oxide value is based on the first period of time. In any case, the second nitrogen oxide value represents a nitrogen oxide emission which is reduced by an actual NOx conversion $\eta_{ist}$ on the basis of the test metering rate DP relative to the raw nitrogen oxide emission, i.e., relative to the first nitrogen oxide value.

If in this case it is merely assumed for example that the second nitrogen oxide value corresponds to a NOx mass of 100 mg based on the first period of time, then this is equivalent to an actual NOx conversion $\eta_{ist}$ of only 40% of the raw NOx emission of 250 mg. Thus the actual NOx conversion $\eta_{ist}$ determined by means of the NOx sensor 8 remains below the calculated desired NOx conversion $\eta_{soll}$ of 60% by a factor of 1.5. Accordingly, for the further operation, the computed base values for the reducing agent metering are increased by an adaptation factor of 1.5. As an alternative to this, the adaptation factor which was valid before the test procedure is increased by a factor of 1.5 to a new adaptation factor. Metering rates D, which are set following the test procedure and which are produced from the computed base value and the adjusted adaptation factor, therefore lead with a high degree of reliability to an actual NOx conversion $\eta_{ist}$, which does not deviate or at all events deviates only slightly from the desired NOx conversion $\eta_{soll}$ which is sought.

If in the test procedure an adaptation factor is produced which differs from one by more than a predeterminable amount, provision may be made to output a corresponding error message. In such a case, a metering system is assumed which is no longer capable of adaptation and in which one of the system components exhibits a malfunction which can no longer be corrected sensibly. In such a case it is also preferable if the test procedure described above is followed by checking routines by which system components, such as for example a reducing agent conveying unit, the reducing agent feed device 6, or further components, are subjected in a targeted manner to functional testing.

The invention claimed is:

1. A method for operating an exhaust gas purification system of a motor vehicle internal combustion engine, wherein the system has a selective catalytic reduction (SCR) catalyst for selective catalytic reduction of nitrogen oxides, comprising the steps of:
   metering a reducing agent containing ammonia into an exhaust gas at a metering rate which is produced from a base value and an adaptation factor which corrects the base value; and
   conducting a test procedure to check the adaptation factor, wherein in the test procedure a first nitrogen oxide value of the exhaust gas is compared with a second nitrogen oxide value of the exhaust gas, wherein the first nitrogen oxide value and the second nitrogen oxide value are determined by a same nitrogen oxide sensor disposed downstream of the SCR catalyst, and wherein the first nitrogen oxide value is determined when the metering of the reducing agent is deactivated and the second nitrogen oxide value is determined when the reducing agent is metered at a predetermined test metering rate.

2. The method according to claim 1, wherein a nitrogen oxide conversion of the SCR catalyst is determined from the first nitrogen oxide value and the second nitrogen oxide value, wherein the determined nitrogen oxide conversion is compared with a desired nitrogen oxide conversion, and wherein when the determined nitrogen oxide conversion deviates by more than a predetermined amount from the desired nitrogen oxide conversion, the adaptation factor is changed and in operating phases following the test procedure, the reducing agent is metered into the exhaust gas at a metering rate produced from the base value and the changed adaptation factor.

3. The method according to claim 1, wherein if the SCR catalyst has a capability for storing ammonia, the first nitrogen oxide value is determined with the SCR catalyst free of stored ammonia.

4. The method according to claim 2, wherein if the SCR catalyst has a capability for storing ammonia, the first nitrogen oxide value is determined with the SCR catalyst free of stored ammonia.

5. The method according to claim 1, wherein the test procedure is conducted following a thermal regeneration of a particle filter associated with the exhaust gas purification system.

6. The method according to claim 2, wherein the test procedure is conducted following a thermal regeneration of a particle filter associated with the exhaust gas purification system.

7. The method according to claim 3, wherein the test procedure is conducted following a thermal regeneration of a particle filter associated with the exhaust gas purification system.

8. The method according to claim 4, wherein the test procedure is conducted following a thermal regeneration of a particle filter associated with the exhaust gas purification system.

9. The method according to claim 1, wherein the base value is determined by a computer model which uses an estimated operating point-dependent nitrogen oxide conversion capacity of the SCR catalyst and an estimated operating point-dependent raw nitrogen oxide emission of the internal combustion engine.

10. The method according to claim 1, wherein when the second nitrogen oxide value is determined, the test metering rate is set to a desired NOx conversion.

11. The method according to claim 10, wherein the desired NOx conversion is in a range from 20% to 80% of nitrogen oxide delivered to the SCR catalyst.

12. The method according to claim 1, wherein the test procedure is conducted under stationary or quasi-stationary conditions.

13. The method according to claim 1, wherein the first and/or the second nitrogen oxide value are determined by integration of a sensor signal provided by the nitrogen oxide sensor.

* * * * *